Nov. 20, 1934. D. V. McILWAIN 1,981,737
BICYCLE
Filed Aug. 21, 1933 2 Sheets-Sheet 1

Daniel V. McIlwain,
INVENTOR

BY Victor J. Evans & Co.
ATTORNEY

WITNESS:
H. J. Meader

Nov. 20, 1934.  D. V. McILWAIN  1,981,737
BICYCLE
Filed Aug. 21, 1933  2 Sheets-Sheet 2
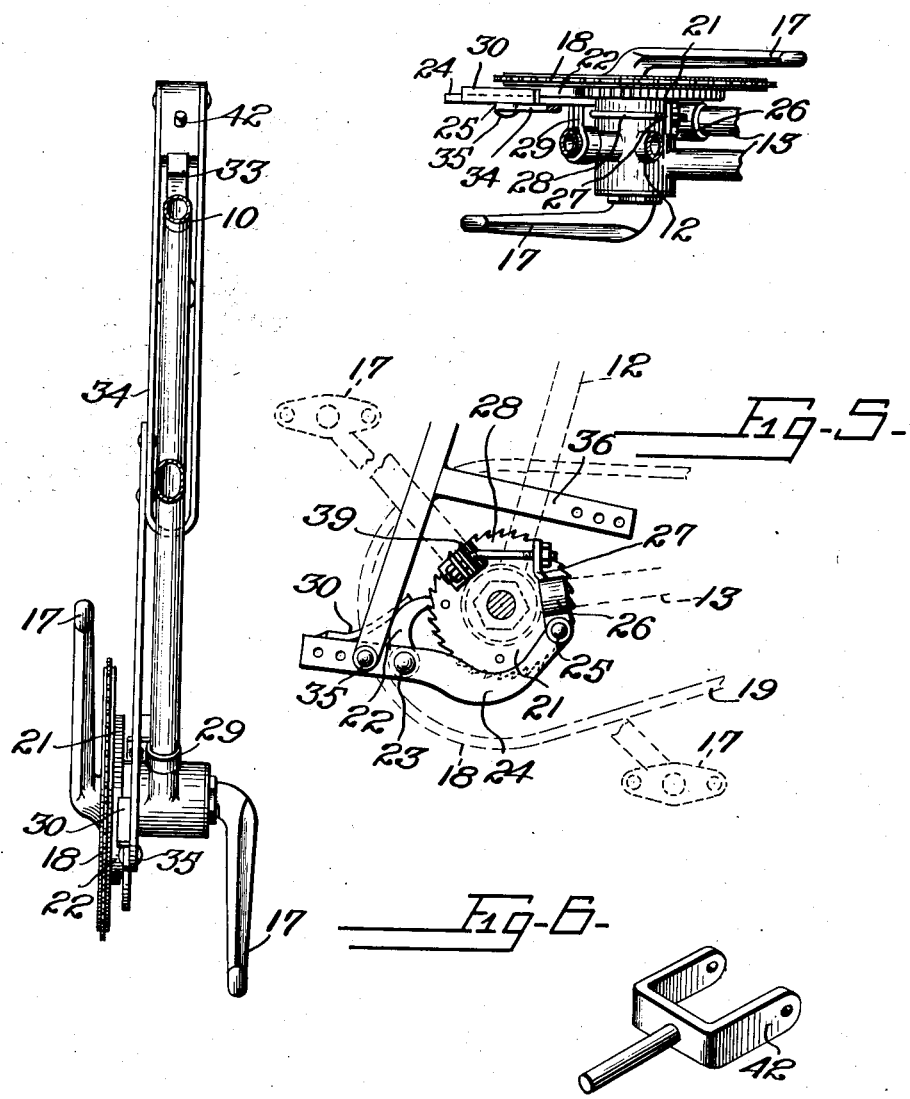
Daniel V. McIlwain,
INVENTOR
BY Victor J. Evans & Co.
ATTORNEY
WITNESS:
H. J. Meador Patented Nov. 20, 1934

1,981,737

UNITED STATES PATENT OFFICE 1,981,737

BICYCLE

Daniel V. McIlwain, Scottsbluff, Nebr.

Application August 21, 1933, Serial No. 686,152

1 Claim. (Cl. 208—21)

The invention relates to a bicycle and more particularly to a power seat attachment for bicycles.

The primary object of the invention is the provision of an attachment of this character, wherein the bicycle seat is supported so that when a rider shifts weight, in operating the bicycle, from one pedal to the other, such weight will actuate the seat for amplifying driving power of the bicycle, the attachment being of novel construction in its entirety.

Another object of the invention is the provision of an attachment of this character, wherein applied power to the driving mechanism of the bicycle is had from the weight of the rider when shifting power from one pedal to the other in impelling such bicycle, thereby increasing the momentum and driving power of the same.

A further object of the invention is the provision of an attachment of this character which is simple in construction, readily and easily applied to and removed from the standard types of safety bicycles, thoroughly reliable and efficient in its functioning, strong, durable, avoiding any discomfort to the rider of the bicycle, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claim hereunto appended.

In the accompanying drawings:

Figure 1 is a side elevation of a bicycle showing the attachment constructed in accordance with the invention and applied thereto.

Figure 2 is a view similar to Figure 1 looking toward the opposite side of the bicycle.

Figure 3 is a fragmentary sectional view on the line 3—3 of Figure 2 looking in the direction of the arrows.

Figure 4 is a sectional view on the line 4—4 of Figure 2 looking in the direction of the arrows.

Figure 5 is a fragmentary side elevation of the attachment on an enlarged scale in the position as shown in Figure 2 of the drawings.

Figure 6 is a perspective view of a coupling of the attachment.

Similar reference characters indicate corresponding parts throughout the several views in the drawings.

Referring to the drawings in detail, A designates generally a bicycle of the safety type including the usual substantially diamond-shaped main frame 10, front steering fork 11, rear upper and lower forks 12 and 13, respectively, the front fork being fitted with the front wheel 14 and the rear upper and lower forks with the rear power wheel 15. The front fork 11 is turned for the steering of the bicycle by handle bars 16, as usual.

In the main frame is journaled the foot pedals 17 operating the main sprocket wheel 18 over which is trained the sprocket chain 19, the same being also trained over the sprocket pinion or gear 20 carried by the rear wheel 15.

The applied power attachment comprises a ratchet wheel 21 centered with respect to the sprocket wheel 18 and made fast thereto in any suitable manner and for engagement by a ratchet dog or pawl 22 pivoted at 23 upon a swinging hanger 24, the latter pivoted at 25 to a clip 26 mounted upon one arm of the rear lower fork 13. This clip 26 carries an upstanding ear 27 fitted with a tie bolt 28 engaged with a second clip 29 fitted upon the lower forward run of the main frame A to avoid any possibility of the said clip 26 becoming accidentally displaced when engaged on the rear lower fork. The pawl or dog 22 is held in operative relation to the ratchet wheel 21 by a leaf spring 30 carried by the hanger 24.

Removably fitted in the saddle or seat column 31 of the main frame 10, at the upper end of said column, is a double arm bracket 32, its forwardly extended arm 33 being fitted with a slidable actuator post or bar 34 for the saddle or seat 35 of the bicycle, the post or bar 34, at its lower end, being adjustably pivoted at 35 to the hanger 24. This post or bar 34 carries a rearwardly directed extension 36 considerably removed from the pivot 35 connecting said bar or post with the hanger and adjustably engaged with the extension 36 is one end of a coiled retractile spring 37, its other end being attached in suspension from a clip 38 secured to the upper rear fork 12.

The bracket 32 has its rear arm 39 provided with a bifurcated terminal 40 in which is engaged a swinging link 41 carried by a coupling 42 mounted in the post or bar 34 next to the saddle or seat 35 and this link limits the downward displacement of the post or bar 34 under the weight of the rider of the bicycle or the occupant of the saddle or seat 35.

It will be apparent that when the bicycle is mounted by a rider and the latter propels the same by foot pedaling, it is necessary that the weight upon one pedal be shifted to the other and this weight, under such shifting action of the rider, will be imposed upon the seat or saddle 35, causing the post or bar 34 to be lowered against the resistance of the spring 37 and when lowered the dog or pawl 22 locks with the ratchet wheel 21, thereby applying power to the driving sprocket wheel 18 of the bicycle, thus supplementing the foot power under the pedaling operation of the rider of the bicycle. When the weight is relieved from the seat or saddle 35 by the rider of the bicycle, the spring 37 causes an uplifting of the post or bar 34 and the dog or pawl 22 will override the ratchet wheel 21 and under the foot pedaling of the rider the bicycle will be advanced or forwardly driven. Thus it should be apparent that by the use of the attachment, added driving power is given to the bicycle and enables a rider to ride with a more restful and flexible motion of the body muscles, when propelling such bicycle.

It should be apparent that when the right pedal of the bicycle is at its lowest point on its down stroke, the power on that pedal comes back on the seat or saddle 35 and thus the attachment causes the ratchet arrangement to turn the left pedal from its central position downward approximately one-quarter of a revolution and when the right pedal comes to its highest point on the upward turn the same ratchet power is applied to it, there being no loss of power in the propelling of the bicycle when the attachment is a part thereof.

The spring 37 is readily adjustable to vary the tensioning thereof through the medium of the adjusting nut 42 at the clip 38.

This spring 37, at the extension 36 end thereof, is adjustably connected at 43 with said extension 36 to properly locate the spring as the occasion may require.

What is claimed is:

In a bicycle, a frame, a pedal drive between the frame and a driving wheel and having a ratchet wheel, a stationary seat post carried by the frame, a pair of removable clips on the frame, a swinging hanger pivoted to one of the clips and having a spring tensioned pivot dog engageable with the ratchet wheel, a shiftable actuator post adjustably connected with the hanger and having an extension, a seat carried by the upper end of said actuator post, a coiled tensioning spring adjustably connected with the extension and with the frame, and a swinging link carried by the seat post and coupled with the actuator post to limit the shifting of said actuator post.

DANIEL V. McILWAIN.